3,079,656
AMINOALKYL POLYSILICATES

Harold Garton Emblem and Albert Keith Harrison, Grappenhall, England, assignors to Philadelphia Quartz Company, Philadelphia, Pa., a corporation of Pennsylvania
No Drawing. Filed Nov. 23, 1960, Ser. No. 71,121
Claims priority, application Great Britain Nov. 27, 1959
13 Claims. (Cl. 22—193)

This invention relates to processes for preparing organic silicates and to their use as binders for particulate solid, especially refractory, materials. The invention also relates to novel organic silicate materials.

Co-pending application Serial Number 13,987 describes the use of gel-forming aminoalkyl silicates as binders for particulate refractory materials, for example in the manufacture of moulds for casting metals. In use, the silicates and refractory materials are mixed to form a slurry and then formed into the desired shape and set by the action of water. The water used to set the binder can be included in the mixture or, in suitable cases, atmospheric moisture can be relied upon to perform this function. The gel-forming aminoalkyl silicates have the advantage over the conventional organic silicate binders, of which ethyl silicate is the main one, in that they do not need a gelation accelerator to cause them to gel. As described in the co-pending application, the aminoalkyl silicates can be prepared by interchange reactions between alkyl silicates and aminoalcohols whereby the alkyl groups, or some of them, of the silicates are replaced by aminoalkyl groups.

If such interchange processes are carried out between ethyl silicate (either orthosilicate or a polysilicate) and the simple aminoalcohols monoethanolamine and monoisopropanolamine, homogeneous products are obtained even if an excess of either silicate or aminoalcohol is used. The products obtained must be kept in sealed containers since they readily form a skin in air resulting from gelation of the silicate by atomspheric moisture.

It has been found, however, that the isopropy silicates, when subjected to an interchange reaction with monoethanolamine or monoisopropanolamine and the proportion of aminoalcohol employed is greater than a certain amount but is not sufficient to effect replacement of all of the isopropyl groups of the silicate, then there is obtained a product which separates into two liquid layers. If the displaced isopropyl alcohol is not distilled off, the amount of aminoalcohol that can be used in the reaction can be increased slightly, but even so the permissible amount of aminoalcohol is still limited if heterogeneous products are to be avoided.

This behaviour of isopropyl silicates is believed to be due to the apparent inability of isopropyl silicates to give rise on reaction with monoethanolamine or monoisopropanolamine to mixed esters, that is silicates containing isopropoxy groups as well as ester groups corresponding to the two named aminoalcohols. The only aminoalkyl silicate believed to be obtained from, for example, monoethanolamine and isopropyl orthosilicate, is 2-aminoethyl orthosilicate $Si(OCH_2CH_2NH_2)_4$. Since isopropyl silicates are only partially miscible with the aminoalkyl silicate products obtained by interchange reactions between these silicates and monoethanolamine and monoisopropanolamine, except for the use of small amounts of the aminoalcohols, heterogeneous products result.

Interchange products which separate into two liquid phases are unsatisfactory for use as binders for refractories because reproducible results are extremely difficult to obtain with their use and recourse to the employment of a mutual solvent for the two liquid phases is necessary. The use of solvents with silicate binders is, however, regarded as a disadvantage in the foundry art because it complicates mould making processes. Even with the presence of a homogenising solvent, the products obtained from isopropyl silicates and monoethanolamine and monoisopropanolamine, except for those in which the proportion of replaced isopropyl groups is very small, form a skin in air and must be kept in sealed containers when not in use. When in use, each time the skin is broken, more skin is produced with a consequential lose of binder. The reaction processes giving rise to the skinning do, in fact, continue even without breakage of the skin and a quantity of the liquid binder if left exposed to the air for a sufficient period, will deteriorate, and may even set completely, and become entirely useless.

The present invention is based on the discovery that isopropyl polysilicates when reacted with aminoalcohol reagents consisting of aminoalcohols of the formula

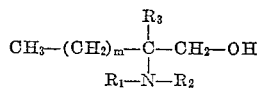

where $R_1$ and $R_2$, which may be the same or different represent hydrogen or methyl, and $m=0$ or 1, $R_3$ being methyl when $m=0$ and hydrogen when $m=1$, or with an aminoalcohol reagent consisting of one or more alcohols of the above formula mixed with either or both of the aminoalcohols monoethanolamine and monoisopropanolamine, in which mixture the total content of alcohols of the above formula is at least 0.25 mol per mol aminoalcohol reagent, can give homogeneous products over a very wide range of proportions of the reactants. Furthermore, while it has been found that such aminoalcohol reagents, like monoethanolamine and monoisopanolamine, do not give homogeneous products when reacted with isopropyl orthosilicate, mixtures of isopropyl polysilicate and orthosilicate have been found to give homogeneous products when reacted with the said aminoalcohol reagents although the permissible amount of orthosilicate in such mixtures is limited and may depend on the amount of aminoalcohol reagent employed.

Accordingly, the present invention provides a process in which a homogeneous liquid silicate product is prepared by subjecting an isopropyl silicate material consisting of isopropyl polysilicate or a mixture of isopropyl polysilicate and orthosilicate, to an interchange reaction either with an aminoalcohol reagent consisting of one or more aminoalcohols of the formula

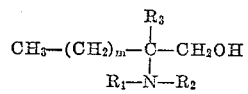

wherein $R_1$ and $R_2$, which may be the same or different, represent hydrogen or methyl, and $m=0$ or 1, $R_3$ being methyl when $m=0$ and hydrogen when $m=1$, or with an aminoalcohol reagent consisting of one or more alcohols of the above formula mixed with either or both of the aminoalcohols monoethanolamine and monoisopropanolamine, in which mixture the total content of alcohols of the above formula is at least 0.25 mol per mol of aminoalcohol reagent. The polysilicate may contain, as well as isopropyl groups, a small proportion of alkyl groups having up to three carbon atoms.

Homogeneous products have been obtained from isopropyl polysilicate/orthosilicate mixtures containing as much as 50% by weight of orthosilicate but to obtain preferred products having a high silica content the isopropyl silicate materials preferably employed are those containing less than about 20% by weight, and more preferably less than 10%, of orthosilicate.

Many of the products obtained by the process of the invention do not skin in air and products exhibiting very little tendency to skin in air have been obtained by replacing as much as one half of the isopropyl groups of the isopropyl silicate starting material.

It has been found that when the aminoalcohol reagent comprises alcohols of the above formula alone, or a mixture of monoethanolamine or monoisopropanolamine or both of these alcohols with 2-amino-2-methyl-propan-1-ol, clear products are obtained, whereas the other aminoalcohol reagents give products which are cloudy in appearance.

The products of the invention gel when mixed with water but not so rapidly as those obtained when using corresponding amounts of monoethanolamine or monoisopropanolamine alone as aminoalcohol reagent. From the above it will be appreciated that the products obtained by the process of the invention are eminently suitable for use in the foundry art as binder media for refractory materials.

The interchange reaction may be performed by heating the isopropyl silicate material and the aminoalcohol reagent at an elevated temperature under reflux conditions. The isopropyl alcohol produced as the interchange reaction proceeds can be distilled off, the amount of alcohol distilled off giving a very convenient indication of the extent of the interchange; it is preferred in general to remove the alcohol produced and take the interchange reaction to completion. The removal of the liberated isopropyl alcohol also results in products which take longer to gel when mixed with water.

The process of the invention results in novel and useful silicate materials which are themselves to be considered as within the scope of the present invention. There may be mentioned in particular the homogeneous liquid silicate materials comprising not more than 50%, and preferably not more than 20%, by weight of orthosilicate, in which the ester groups are groups of the formulae

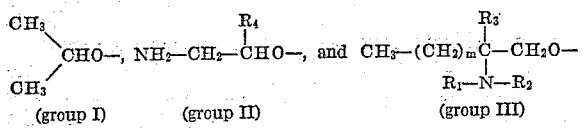

(group I)   (group II)   (group III)

wherein $R_1$, $R_2$, $R_3$ and $m$ have the above meanings, $R_4$ represents hydrogen or methyl; and the number of the group III divided by the number of the sum of the groups II and III is at least 0.25. Of especial value are the homogeneous liquid silicate materials (comprising not more than 50%, and preferably not more than 20%, by weight of orthosilicate) in which the ester groups are groups of the formulae

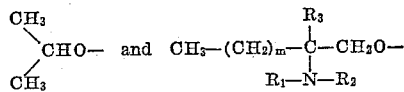

where $R_1$, $R_2$, $R_3$ and $m$ have the above meanings. In each of these silicate materials, the number of the ester groups being other than isopropoxy groups divided by the total number of ester groups is preferably at least 0.1.

The products of the invention gel when water is added to them without requiring a mutual solvent. For those materials obtained by the process of the invention which contain unreplaced isopropyl groups, the gelling time depends on the proportion of isopropyl groups to aminoalkyl groups. Thus, silicate materials having desired gelling characteristics can be obtained by a suitable choice of the proportions of the ester groups. The silicate materials are of value as binders for ceramic materials to make moulds for use in investment casting processes or to make shaped refractory articles. In binding the solid materials the material to be bound is mixed with an appropriate quantity of the silicate, shaped to the form desired and the composition allowed to set by the action of water; no gelation accelerator is necessary. The silicates can be used by mixing them with fine refractory powders to give slurries which are then used to coat a wax or other expendable pattern to provide an accurate and smooth surface in a mould made by investing the coated pattern by the normal methods of the investment process, for instance using coarse refractory powders made into a slurry with acid hydrolysed ethyl silicate solution. The coated pattern can be allowed to stand to take up atmospheric moisture to set the coating prior to investment but the setting can be speeded up by dusting the coating with a coarse refractory moistened with water. Furthermore, a ceramic shell mould can be made by the repeated dipping of a wax or other pattern into a slurry of fine refractory material and a silicate binder produced by the process of the invention with alternate dusting of a coarse refractory onto the coating; in order to speed up the process a coarse refractory powder moistened with water can be used for the dusting.

The extent of the desired replacement of the alkyl groups of the isopropyl silicate in the process of the invention is conveniently expressed in terms of the number of aminoalkyl groups to be present in the final product per silicon atom. The quantity of aminoalcohol reagent required to give a pre-determined degree of replacement can be calculated from the silica content of the isopropyl silicate material concerned. Thus, for example, if it is required to produce a product in which there is one aminoalkyl group per silicon atom, then the reaction components are employed in the proportion of 1 g. mol. of aminoalcohol reagent to that weight of the silicate material which contains 1 g. mol. of silica.

The preferred products of the process of the invention are those containing at least about 0.1 aminoalkyl groups per silicon atom. For the manufacture of shaped refractory articles suitable products are those containing about 0.1 to 0.7, for example about 0.2 to 0.5 aminoalkyl groups per silicon atom. In the preparation of slurries for applying to expendable patterns to form the pre-investment coating and in the preparation of slurries for making ceramic shell moulds, in which preparations a silicate product having a rapid rate of gelation can be employed, products containing 0.7 or more aminoalkyl groups per silicon atom, can be used. Products in which all the isopropyl groups of the isopropyl silicate are replaced by aminoalkyl groups gel very rapidly. When a slurry containing a binder which gels rapidly is used to form thin coatings as in the production of pre-investment slurries and shell moulds, the water necessary to set the coating can be provided by the moisture of the atmosphere.

The invention thus also relates to a process for binding particulate solids in which the solid material is mixed with a product produced by the process according to the invention and the composition allowed to set by the action of water; the water may be included in the mixture or atmospheric moisture used to set the composition.

The following examples illustrate the invention. Examples 1 to 16 and 19 to 22 illustrate processes in accordance with the invention; Examples 17 and 18 illustrate other processes and given for comparative purposes; and Examples 23 to 26 illustrate the use of products of the invention as binders for refractory powders.

*Example 1*

The preparation of an isopropyl polysilicate will first be described. A mixture of isopropyl alcohol (232.6 g.) and distilled water (17.3 ccs.), was slowly added to silicon tetrachloride (170 g.), the amount of water corresponding to 0.96 mol. per mol. of the tetrachloride. When addition was complete, the mixture was refluxed for one hour and left overnight. Excess isopropyl alcohol (137.5 g.) was then removed by distillation up to 100° C., leaving a substantially neutral crude isopropyl silicate having a silica content of 38.05%. The orthosilicate content was 5.4%.

162 grams of the isopropyl polysilicate and 0.2 gram mol. of 2-amino-2-methyl-propan-1-ol were heated in a flask fitted with a fractionating column and condenser, so that isopropyl alcohol could be slowly distilled off. The theoretical quantity of isopropyl alcohol was distilled off in two hours. A homogeneous product which did not skin in air was obtained. The product is termed herein polysilicate A; it contained about 0.2 aminoalkyl groups per silicon atom.

The following table illustrates the gelation behaviour of polysilicate A.

| Volume of polysilicate A, ml. | Volume of water added, ml. | Gelation time, mins. |
|---|---|---|
| 10 | 0.6 | 15 |
| 10 | 1.2 | 10.5 |
| 10 | 1.8 | 10 |
| 10 | 2.4 | 10 |

*Example 2*

162 g. of isopropyl polysilicate prepared by the method described in Example 1 and 0.25 g. mol. of 2-amino-butan-1-ol were heated in a flask fitted with a fractionating column and condenser, so that isopropyl alcohol could be slowly distilled off. The theoretical quantity of isopropyl alcohol was distilled off in three hours. A homogeneous product which did not skin in air was obtained. The product is termed herein polysilicate B; it contained about 0.25 aminoalkyl groups per silicon atom.

The gelation behaviour of polysilicate B is shown in the following table.

| Volume of polysilicate B, ml. | Volume of water added, ml. | Gelation time, mins. |
|---|---|---|
| 10 | 2 | 4¼ |
| 10 | 1 | 4½ |

*Example 3*

243 g. of isopropyl polysilicate, having a silica content of 36.9% and an orthosilicate content of 8%, and 133.5 g. of 2-methyl-2-amino-propan-1-ol were heated in a flask fitted with a fractionating column and a condenser, so that isopropyl alcohol could be slowly distilled off. After 2 hours of heating at 130° C., during which time 50 g. of isopropyl alcohol was recovered, the temperature was raised to 190° C. and the reactants heated for a further 2 hours. At the end of this time the total weight of isopropyl alcohol distilled off was 87.2 g., corresponding to 97% recovery. A homogeneous product which had a slight tendency to skin in air was obtained. The product is termed herein polysilicate C; it contained about 1.0 aminoalkyl group per silicon atom.

10 ml. of the polysilicate C when mixed with 2 ml. of water gelled in 30 seconds.

*Example 4*

162 g. of isopropyl silicate, having a silica content of 36.9% and an orthosilicate content of 8%, and 0.2 mol. of 2-dimethylamino-2-methyl-propan-1-ol were reacted in a manner similar to that employed for the preparation of the polysilicate A of Example 1; a homogeneous product which did not skin in air was obtained. The product obtained contained about 0.2 aminoalkyl groups per silicon atom.

10 ml. of the polysilicate reaction product when mixed with 2 ml. of water gelled in 90 minutes.

*Example 5*

9072 g. of isopropyl polysilicate having a silica content of 38.1% and an orthosilicate content of 16.4% were reacted with 482 g. of 2-methyl-2-amino-propan-1-ol in a flask fitted with a fractionating column and condenser, so that isopropyl alcohol could be distilled off. The temperature of the reaction mixture was kept at 100-110° C., and dry air blown through at a flow rate of 70 litres/hour. Heating and aeration were discontinued when the theoretical amount of isopropyl alcohol (283.5 g.) was recovered. The product was allowed to cool overnight before the gel time was determined. 10 ml. of the product when mixed with 2 ml. of water gelled in 75 minutes. The product, which had a silica content of 37.4%, was homogeneous and did not skin in air. The product contained approximately 0.1 aminoalkyl groups per silicon atom.

*Example 6*

To the product of Example 5, another 453.6 g. of 2-methyl-2-amino-propan-1-ol were added, and another 283.5 g. of isopropyl alcohol recovered, as described in Example 5. The resulting product, which had a silica content of 36.8%, was homogeneous and did not skin in air. The product contained approximately 0.2 aminoalkyl groups per silicon atom. 10 ml. of this product on mixing with 2 ml. of water gelled in 25 minutes.

*Example 7*

To increase the degree of substitution of the product of Example 6 to 0.3 aminoalkyl groups per silicon atom, 335 g. of Example 6 product (2 g. mol) were reacted with 18 g. of 2-amino-2-methyl-propan-1-ol (0.2 g. mol), and the theoretical amount of isopropyl alcohol recovered by heating the mixture to 120° C. The product obtained was homogeneous and did not skin in air. 10 ml. of the product mixed with 2 ml. of water gelled in 8 minutes.

*Example 8*

162 g. of isopropyl polysilicate having a silica content of 36.9% and an orthosilicate content of 8% were reacted with a mixture of 0.1 g. mol of 2-amino-2-methyl-propan-1-ol, 0.05 g. mol of monoethanolamine and 0.05 g. mol of monoisopropanolamine in a flask fitted with a fractionating column and condenser, so that isopropyl alcohol could be distilled off. The theoretical amount of isopropyl alcohol (0.2 g. mol) was distilled off in about 2 hours, giving a homogeneous reaction product which did not form a skin in air. The silica content of the product was 36.3%. 10 ml. of the product when mixed with 2 ml. of water gelled in 10½ minutes. The product contained about 0.2 aminoalkyl groups per silicon atom.

*Example 9*

8100 g. (50 g. mol) of isopropyl polysilicate having a silicia content of 36.9% and an orthosilicate content of 8% were reacted with 305 g. (5 g. mol) of monoethanolamine and 445 g. (5 g. mol) of 2-amino-2-methyl-propan-1-ol in a flask fitted with a fractionating column and reflux condenser so that isopropyl alcohol could be distilled off. The reaction was carried out as described in Example 5, and the theoretical amount of isopropyl alcohol (600 g.—10 g. mol) was recovered. The product was homogeneous and did not form a skin in air; it had a silica content of 36.3%. 10 ml. of the product when mixed with 2 ml. of water gelled in 13½ minutes. The product contained about 0.2 aminoalkyl groups per silicon atom.

*Example 10*

7500 g. of isopropyl polysilicate having a silica content of 36.9% and an orthosilicate content of 8% were reacted with 835 g. of 2-amino-2-methyl-propan-1-ol, following the method described in Example 5, and the theoretical amount of isopropyl alcohol (562 g.) was recovered. The product was homogeneous and did not form a skin in air; it had a silica content of 35%. 10 ml. of the product when mixed with 2 ml. of water gelled in 14 minutes. The product contained about 0.2 aminoalkyl groups per silicon atom.

*Examples 11 to 18*

162 g. (1 molecular unit) of isopropyl silicate having a silica content of 36.9% and an orthosilicate content of 5.2% was reacted with various mixtures of 2-amino-2-methyl-propan-1-ol and monoethanolamine, as detailed in the table. Various mixtures of 2-amino-2-methyl-propan-1-ol and monoisopropanolamine were also reacted, as detailed in the table. The mixture of silicate and amino alcohols was heterogeneous before reaction. The reaction was carried out by heating the mixture under reflux for an hour, no liberated isopropyl alcohol being removed. Examples 17 and 18 are comparative and illustrate the properties of the products obtained by reacting in a similar way isopropyl silicate and monoethanolamine and monoisopropanolamine. Gel times were determined by mixing 10 ml. of the reaction product with 2 ml. of water. Each of the products contained about 0.2 aminoalkyl groups per silicon atom.

| Example | Reaction system | Appearance of product | Gel time, minutes |
|---|---|---|---|
| 11 | Isopropyl polysilicate+0.1 mol monoethanolamine and 0.1 mol 2-amino-2-methyl-propan-1-ol. | Clear, no skin formed in air | 6½ |
| 12 | Isopropyl polysilicate + 0.05 mol monoethanolamine and 0.15 mol 2-amino-2-methyl-propan-1-ol. | ___do___ | 10 |
| 13 | Isopropyl polysilicate + 0.15 mol monoethanolamine and 0.05 mol 2-amino-2-methyl-propan-1-ol. | Clear, slight tendency to skin in air. | 6 |
| 14 | Isopropyl polysilicate + 0.1 mol mono-isopropanolamine and 0.1 mol 2-amino-2-methyl-propan-1-ol. | Clear, no skin formed in air. | 7 |
| 15 | Isopropyl polysilicate + 0.05 mol mono-isopropanolamine and 0.15 mol 2-amino-2-methyl-propan-1-ol. | ___do___ | 7 |
| 16 | Isopropyl polysilicate + 0.15 mol mono-isopropanolamine and 0.05 mol 2-amino-2-methyl-propan-1-ol. | ___do___ | 5 |
| 17 | Isopropyl polysilicate + 0.2 mol monoethanolamine. | Cloudy, readily skinning in air. | 3½ |
| 18 | Isopropyl polysilicate + 0.2 mol monoisopropanolamine | Clear, readily skinning in air. | 3 |

By reacting in a similar way isopropyl polysilicate and 0.3 mol. monoisopropanolamine, again without removing the liberated isopropyl alcohol, a clear product was obtained. More than 0.3 mol of aminoalcohol gave, however, a heterogeneous product. The gel time of a mixture of the 0.3 mol monoisopropanolamine product (10 ml.) and water (1 ml.) was 20 seconds.

*Example 19*

162 g. of isopropyl polysilicate having a silica content of 37% and containing 7% orthosilicate were reacted with a mixture of 0.1 g. mol of 2-amino-butan-1-ol and 0.1 g. mol of monoethanolamine, the theoretical amount of isopropyl alcohol being recovered. The product was slightly cloudy, but did not form two liquid layers; it did not form a skin in air. 10 ml. of the product when mixed with 2 ml. of water gelled in 13¼ minutes. The product contained about 0.2 aminoalkyl groups per silicon atom.

*Example 20*

162 g. of isopropyl polysilicate having a silica content of 37% and containing 7% orthosilicate were reacted with a mixture of 0.15 g. mol of 2-dimethylamino-2-methyl-propan-1-ol and 0.15 g. mol of monoethanolamine, the theoretical amount of isopropyl alcohol being recovered. The product was slightly cloudy, but did not form two liquid layers; it did not form a skin in air. 10 ml. of the product when mixed with 2 ml. of water gelled in 4¾ minutes. The product contained about 0.3 aminoalkyl groups per silicon atom.

The isopropyl polysilicate materials employed in Examples 3 to 5 and 8 to 20 are suitably prepared by the general methods described in Examples 6 and 7 of copending application Serial Number 13,988.

*Example 21*

180 g. of a mixture of isopropyl orthosilicate and isopropyl polysilicate, the mixture having a silica content of 33.2%, an orthosilicate content of 30% and containing 1 g. mol of silica, were reacted with 26.7 g. (0.3 mol) of 2-amino-2-methyl-propan-1-ol. The theoretical amount of isopropyl alcohol was recovered. The reaction product was clear and homogeneous and did not skin in air; it contained 0.3 aminoalkyl groups per silicon atom.

10 ml. of the reaction product when mixed with 2½ ml. of water gelled in 5½ minutes.

*Example 22*

200 g. of a mixture of isopropyl orthosilicate and isopropyl polysilicate, the mixture having a silica content of 22.7%, an orthosilicate content of 50% and containing 1 g. mol. of silica, were reacted with 26.7 g. (0.3 mol) of 2-amino-2-methyl-propan-1-ol. The theoretical amount of isopropyl alcohol was recovered. The reaction product was clear and homogeneous and did not skin in air; it contained 0.3 aminoalkyl groups per silicon atom.

10 ml. of the reaction product when mixed with 2 ml. of water gelled in 10 minutes giving a weak gel.

*Example 23*

This example concerns the preparation of refractory crucibles from sillimanite using the polysilicate A of Example 1 as a binder.

45 g. of sillimanite, all passing a 100 mesh I.M.M. sieve (which has an aperture size of 0.127 mm.), were mixed with 25 g. of sillimanite, all passing a 30 mesh I.M.M. sieve (which has an aperture size of 0.421 mm.) and all retained on an 80 mesh I.M.M. sieve (which has an aperture size of 0.157 mm.). To this mixture was added 21 ml. of the polysilicate A and 4 ml. of water. The resultant slurry had a working life of about 15 minutes. The slurry was poured into a crucible mould made of brass. When the slurry gelled, the crucible was easily removed from the mould.

The crucibles so prepared were allowed to dry overnight, then fired to 1600° C. in the course of 2 hours, and held at this temperature for 6 hours to develop the silica bond.

Improved wetting of the sillimanite powder was obtained by mixing polysilicate A with wetting agents prepared by condensing ethylene oxide with alkyl phenols. A suitable wetting agent is nonyl phenol condensed with 5 mols. of ethylene oxide; this may be added to polysilicate A in amounts up to 10% (v./v.).

*Example 24*

This example concerns the preparation of a refractory crucible from sillimanite using the polysilicate B of Example 2 as a binder.

30 g. of sillimanite, all passing a 30 mesh I.M.M. standard sieve, and all retained on an 80 mesh I.M.M. standard sieve, were mixed with 30 g. of sillimanite, all of which passed a 100 mesh I.M.M. standard sieve. To this mixture were added 20 ml. of the polysilicate B and 2 ml. of water. The resultant slurry had a working life of about 10 minutes. The slurry was poured into a crucible mould made of brass. When the slurry gelled, the crucible was easily removed from the mould.

The crucibles so prepared were allowed to dry overnight, then fired to 1600° C. in the course of 2 hours, and held at this temperature for 6 hours to develop the silica bond.

*Example 25*

This example concerns the preparation of a ceramic shell mould from refractory material using the polysilicate C of Example 3 as a binder.

20 g. of polysilicate C were mixed with 15 g. of fine silica powder of such particle size that it passed a 170 mesh B.S. sieve (which has an aperture size of 0.089 mm.—see British Standard 410: 1943). A wax pattern was dipped in the slurry and dusted with sillimanite of such particle size that it passed a 30 mesh I.M.M. sieve but was retained on an 80 mesh I.M.M. sieve, and allowed to set by the action of atmospheric moisture. The pattern was then dipped again into the slurry and dusted with dampened sillimanite of the same particle size as that previously used; the sillimanite was dampened with water although a mixture of water and isopropyl alcohol, for example, is also suitable. These dipping and dusting operations were repeated three times, allowing 10 minutes for drying between each coating. The coated pattern was given a final sealing dip into the slurry, the coating being allowed to set this time without dusting. The completed ceramic shell mould was allowed to air-dry overnight, the wax pattern then being removed by melting.

*Example 26*

A refractory crucible was made from the product of Example 5 and sillimanite, following the general procedure of Example 23. The sillimanite powder used was a mixture of 30 g. of material all passing a 100 mesh I.M.M. sieve with 30 g. of material all passing a 30 mesh I.M.M. sieve and all retained on an 80 mesh I.M.M. sieve. To this mixture was added 20 ml. of product and 4 ml. of water. The crucible was air dried overnight, then fired as described in Example 23.

The products of Examples 6 and 7 were also used to prepare refractory crucibles in a similar way and in each case good hard and strong crucibles were obtained after firing.

What is claimed is:

1. A process for preparing a homogeneous liquid silicate product comprising subjecting an isopropyl silicate material selected from the group consisting of (1) isopropyl polysilicate and (2) isopropyl polysilicate in admixture with isopropyl orthosilicate, to an interchange reaction with an aminoalcohol reagent selected from the group consisting of aminoalcohols of the formula:

$$CH_3-(CH_2)_m-\underset{\underset{R_1-N-R_2}{|}}{\overset{R_3}{\underset{|}{C}}}-CH_2-OH$$

wherein $R_1$ and $R_2$ are selected from the group consisting of hydrogen and methyl, and $m$ has the values 0 and 1, $R_3$ being methyl when $m$ is 0 and hydrogen when $m$ is 1, and aminoalcohol mixtures consisting of alcohols of the above formula mixed with aminoalcohols selected from the group consisting of monoethanolamine and monoisopropanolamine, in which mixtures the total content of alcohols of the above formula is at least 0.25 mol per mol of aminoalcohol reagent, the reaction components being employed in the proportion of about 0.1 to 1.0 g. mol of aminoalcohol reagent to that weight of the isopropyl silicate material which contains 1 g. mol of silicon.

2. A process as claimed in claim 1 in which in the said formula $R_1$ and $R_2$ represents hydrogen.

3. A process as claim in claim 2 in which in the said formula $m$ is equal to 0.

4. A homogeneous liquid silicate material comprising not more than 50% by weight of orthosilicate, in which silicate material the ester groups are groups of the formulae $$\begin{array}{c} CH_3 \\ \diagdown \\ CHO \\ \diagup \\ CH_3 \end{array} \quad \text{(group I)}$$

$$NH_2-CH_2-\overset{R_4}{\underset{|}{C}}HO \quad \text{(group II)}$$

$$CH_3-(CH_2)_m-\underset{\underset{R_1-N-R_2}{|}}{\overset{R_3}{\underset{|}{C}}}-CH_2O \quad \text{(group III)}$$

wherein $R_1$, $R_2$, $R_3$ and $m$ have the meanings specified in claim 1; $R_4$ is selected from the group consisting of hydrogen and methyl; the number of the groups III divided by the sum of the number of the groups II and III being at least 0.25, and the sum of the number of groups II and III being from 0.1 to 1.0 of the number of silicon atoms in the silicate material.

5. A homogeneous liquid silicate material consisting of not more than 50% weight of orthosilicate, in which silicate material the ester groups are groups of the formulae $$\begin{array}{c} CH_3 \\ \diagdown \\ CHO \\ \diagup \\ CH_3 \end{array}$$

and $$CH_3-(CH_2)_m-\underset{\underset{R_1-N-R_2}{|}}{\overset{R_3}{\underset{|}{C}}}-CH_2O$$

where $R_1$, $R_2$, $R_3$ and $m$ have meanings specified in claim 1, and the number of groups of the second formula being from 0.1 to 1.0 of the number of silicon atoms in the silicate material.

6. A homogeneous liquid silicate material as claimed in claim 4 in which $R_1$ and $R_2$ both represent hydrogen.

7. A homogeneous liquid silicate material as claimed in claim 5 in which $R_1$ and $R_2$ both represent hydrogen.

8. A homogeneous liquid silicate material as claimed in claim 6 in which $R_3$ represents methyl.

9. A homogeneous liquid silicate material as claimed in claim 7 in which $R_3$ represents methyl.

10. A homogeneous liquid silicate material as claimed in claim 4 in which the amount of orthosilicate present is from 0 to 20% by weight of the material.

11. A homogeneous liquid silicate material as claimed in claim 5 in which the amount of orthosilicate present is from 0 to 20% by weight of the material.

12. A process for binding a particulate refractory material in which the refractory material is mixed with a product as claimed in claim 4 and the composition allowed to set by the action of water.

13. A process as claimed in claim 12 for the manufacture of shell moulds for the casting of metals, in which process the mixture is shaped in the form of a series of coatings on an expendable pattern, each coating being set before the next is applied, after which the coatings are hardened and the pattern then removed.

References Cited in the file of this patent

UNITED STATES PATENTS

| | | |
|---|---|---|
| 2,027,932 | Ray | Jan. 14, 1936 |
| 2,660,538 | Emblem et al. | Nov. 24, 1953 |
| 2,885,419 | Beinfest et al. | May 5, 1959 |

FOREIGN PATENTS

| | | |
|---|---|---|
| 637,532 | Germany | Oct. 30, 1936 |
| 1,066,582 | Germany | Oct. 8, 1959 |

OTHER REFERENCES

Di Giorgio et al.: "Jour. Am. Chem. Soc.," vol. 71 (1949), pp. 3254–6.

UNITED STATES PATENT OFFICE
CERTIFICATE OF CORRECTION

Patent No. 3,079,656                      March 5, 1963

Harold Garton Emblem et al.

It is hereby certified that error appears in the above numbered patent requiring correction and that the said Letters Patent should read as corrected below.

Column 1, line 21, after "in" insert a hypen; line 41, for "isopropy" read -- isopropyl --; column 2, line 10, for "lose" read -- loss --; line 29, after "mol" insert -- of --; line 33, for "monoisopanolamine" read -- monoisopropanolamine --; column 3, line 40, (group III), for that portion of the formula reading:
$$(CH_2)_m \quad \text{read} \quad (CH_2)_m\text{-}$$
column 6, line 49, for "silicia" read -- silica --; column 9, line 58, for "claim", first occurrence, read -- claimed --.

(SEAL)       Signed and sealed this 19th day of November 1963.

Attest:

ERNEST W. SWIDER                     EDWIN L. REYNOLDS

Attesting Officer                      Acting Commissioner of Patents